US008838991B2

(12) United States Patent
Baker

(10) Patent No.: US 8,838,991 B2
(45) Date of Patent: Sep. 16, 2014

(54) SECURE BIOMETRIC IDENTITY BROKER MODULE

(75) Inventor: Arthur H. Baker, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 972 days.

(21) Appl. No.: 12/416,391

(22) Filed: Apr. 1, 2009

(65) Prior Publication Data
US 2010/0257369 A1 Oct. 7, 2010

(51) Int. Cl.
*G06F 21/00* (2013.01)
*G06F 21/32* (2013.01)
*G06F 21/40* (2013.01)

(52) U.S. Cl.
CPC ........ *G06F 21/32* (2013.01); *G06F 2221/2117* (2013.01); *G06F 21/40* (2013.01)
USPC .......................................................... 713/186

(58) Field of Classification Search
CPC .......................... G06F 21/32; G06F 2211/2117
USPC .......................................................... 713/186
See application file for complete search history.

(56) References Cited

U.S. PATENT DOCUMENTS

| | | | |
|---|---|---|---|
| 7,136,490 B2 * | 11/2006 | Martinez et al. | 380/284 |
| 7,496,751 B2 * | 2/2009 | de Jong et al. | 713/155 |
| 7,505,941 B2 * | 3/2009 | Bishop et al. | 705/67 |
| 7,613,659 B1 * | 11/2009 | Hoffman et al. | 705/44 |
| 7,664,962 B2 * | 2/2010 | Kuhlman | 713/186 |
| 7,793,109 B2 * | 9/2010 | Ortiz | 713/186 |
| 7,809,170 B2 * | 10/2010 | Phoha | 382/115 |
| 7,917,741 B2 * | 3/2011 | Dutton et al. | 713/1 |
| 7,925,887 B2 * | 4/2011 | Burton | 713/186 |
| 2003/0208684 A1 * | 11/2003 | Camacho et al. | 713/186 |
| 2007/0198849 A1 * | 8/2007 | Mozer | 713/186 |
| 2008/0209230 A1 * | 8/2008 | Verma et al. | 713/186 |
| 2010/0138914 A1 * | 6/2010 | Davis et al. | 726/19 |

OTHER PUBLICATIONS

Yuan et al., Towards a BioAPI compliant face verification system, 2003, Retrieved from the Internet <URL: sciencedirect.com/science/article/pii/S0920548903001132>, pp. 1-11 as printed.*

(Continued)

*Primary Examiner* — Michael Chao
(74) *Attorney, Agent, or Firm* — Tony Azure; Mike Allen; Micky Minhas

(57) ABSTRACT

A biometric identity broker can obtain exclusive control of biometric sensors communicationally coupled to a computing device, and can create biometric unit components for each of the sensors. Each biometric unit component can utilize a sensor plug-in, a processing plug-in and a storage plug-in, that can either be provided with the sensor or can be default plug-ins, in order to provide a baseline level of functionality irrespective of the functionality provided by, or with, the sensor to which the biometric unit is associated. A factor-specific service provider can act across all biometric units associated with sensors directed to a common biometric factor and can arbitrate among multiple clients simultaneously awaiting input and can manage multiple identities associated with a single biometric template based on the sensor receiving the biometric input. The biometric identity broker, factor-specific service providers and biometric units can be part of the trusted computing base.

20 Claims, 6 Drawing Sheets

(56) References Cited

OTHER PUBLICATIONS

Westergaard, Supporting Multiple Pointing Devices in Microsoft Windows, 2002, retrieved from the Internet <URL: .cs.au.dk/~mw/local/Westergaard.pdf>, pp. 1-10 as printed.*

Lampson et al., Authentication in Distributed Systems: Theory and Practice, 1992, retrieved from the Internet <URL: dl.acm.org/citation.cfm?id=138874>, pp. 1-46 as printed.*

Windows Biometric Framework, 2009, Microsoft, Retrieved from the Internet <URL: msdn.microsoft.com/en-us/windows/hardware/gg463081.aspx>, pp. 1-1 as printed.*

Terms and Definitions, 2013, Retrieved from the Internet <URL: http://msdn.microsoft.com/en-us/library/windows/desktop/dd401597>, pp. 1-2 as printed.*

Kasselman et al., Nov. 2008, Microsoft, Retrieved from the Internet <URL: http://msdn.microsoft.com/en-us/windows/hardware/gg463168> pp. 1-34 as printed.*

"Biometric Service API", retrieved at <<http://msdn.microsoft.com/en-us/library/dd401509(VS.85,printer).aspx>>, p. 1.

"BioAPI Consortium", retrieved at <<http://www.bioapi.org/index.asp>>, p. 1.

* cited by examiner

SECURE BIOMETRIC IDENTITY BROKER MODULE

BACKGROUND

Access to information stored on computer-readable media, and access to computing resources themselves, can be protected from unauthorized access by requiring, as a condition of access, the provision of one or more identifying elements of data. Traditionally, such identifying elements of data have included passwords or other like data that can be remembered by a user and then provided when prompted to enable such a user to access the protected information or computing resources. As computing devices have become more ubiquitous, the information and computing resources that require protection from unauthorized access has increased while the sophistication and abilities of malicious entities seeking to gain unauthorized access has also increased. Consequently, users have been forced to remember or maintain access to an ever increasing array of identifying data.

Modern computing devices, with their increased processing and storage capacity, are able to obtain biometric information from users in a reliable manner such that that biometric information can serve as the identifying information by which users are granted access to protected computer-readable information or computing resources. While such biometric information typically includes fingerprints, it can also include voice, iris, or other like biometric information. Thus, rather than remembering a password, for example, a modern computer user can simply swipe their finger across a fingerprint sensor and be provided access to protected information or computing resources.

If a malicious entity were to obtain a user's password, or other identifying element of data, access to the protected information or resources can be easily restored by assigning the legitimate user another, different password or identifying data. However, if a malicious entity were to obtain a user's biometric information, such information cannot be so easily changed. A user's fingerprint, for example, is, absent trauma or complex medical procedures, immutable.

SUMMARY

To protect a user's biometric information from malicious entities, and thereby preserve it as a meaningful access mechanism with which to access protected information or resources, the collection, processing and utilization of biometric information can be centralized into one or more components of computer-executable instructions that can be protected from tampering, modification or interception.

In one embodiment, a biometric broker component can provide a centralized mechanism by which clients can access biometric information. The biometric broker can provide clients the ability to collect biometric data, generate a template from that data, and compare subsequent biometric data to the template, among other functions. The provision of such abilities can be through the use of persistent handles, or other similar mechanisms, that can enable a client to reference biometric data without actually having direct access to such biometric data. Such isolation can provide for a measure of security. Additionally, specific clients can be granted greater, or fewer, abilities depending on how the biometric data is being used by such clients and whether the client is, for example, executing with increased privileges, such as in an administrator context.

In another embodiment, service provider components can provide factor-specific functionality across multiple biometric sensors of a particular type, or collecting a particular biometric factor. The factor-specific service providers, by centralizing factor-specific functionality, can enable a single biometric factor to be associated with multiple types of identities or identity values. Each identity type or identity value can, in turn, have unique types of auxiliary data, such as passwords, identifiers, or other information, associated with it.

In a yet another embodiment, individual biometric unit components can provide a homogenous interface to individual biometric sensors by employing plug-in components that can provide for functionality not provided by the biometric sensor itself. The biometric unit component can interface with the biometric sensor, biometric data processing capabilities associated with the sensor, and a secure store of biometric templates that can be utilized by the biometric data processing capabilities. Whatever functionality, from among the collection, processing and storage of biometric data, is not provided by, or associated with, the biometric sensor, can be provided, instead, by one or more plug-in components, thereby enabling the biometric unit component to present a homogenous interface for each biometric sensor, irrespective of the specific capabilities associated with the sensor.

In a further embodiment, the centralized components that provide for the processing and handling of biometric data, such as the biometric broker, the factor-specific service providers and the biometric unit components, can all be part of the Trusted Computing Base, such that any modification to such components will prevent access to biometric data, or otherwise protect it.

In a yet further embodiment, simultaneous requests, such as by two or more clients, for biometric-data-centric tasks, can be arbitrated in a factor-specific manner, such that arbitration is tailored to the biometric factor associated with the simultaneous requests. Such arbitration can be performed by the factor-specific service provider component associated with the biometric factor associated with the simultaneous requests. The receipt of biometric data that was not requested, can similarly be handled in a factor-specific manner by the factor-specific service provider component associated with the biometric factor of the unrequested, received biometric data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which

DETAILED DESCRIPTION

Figure 1:
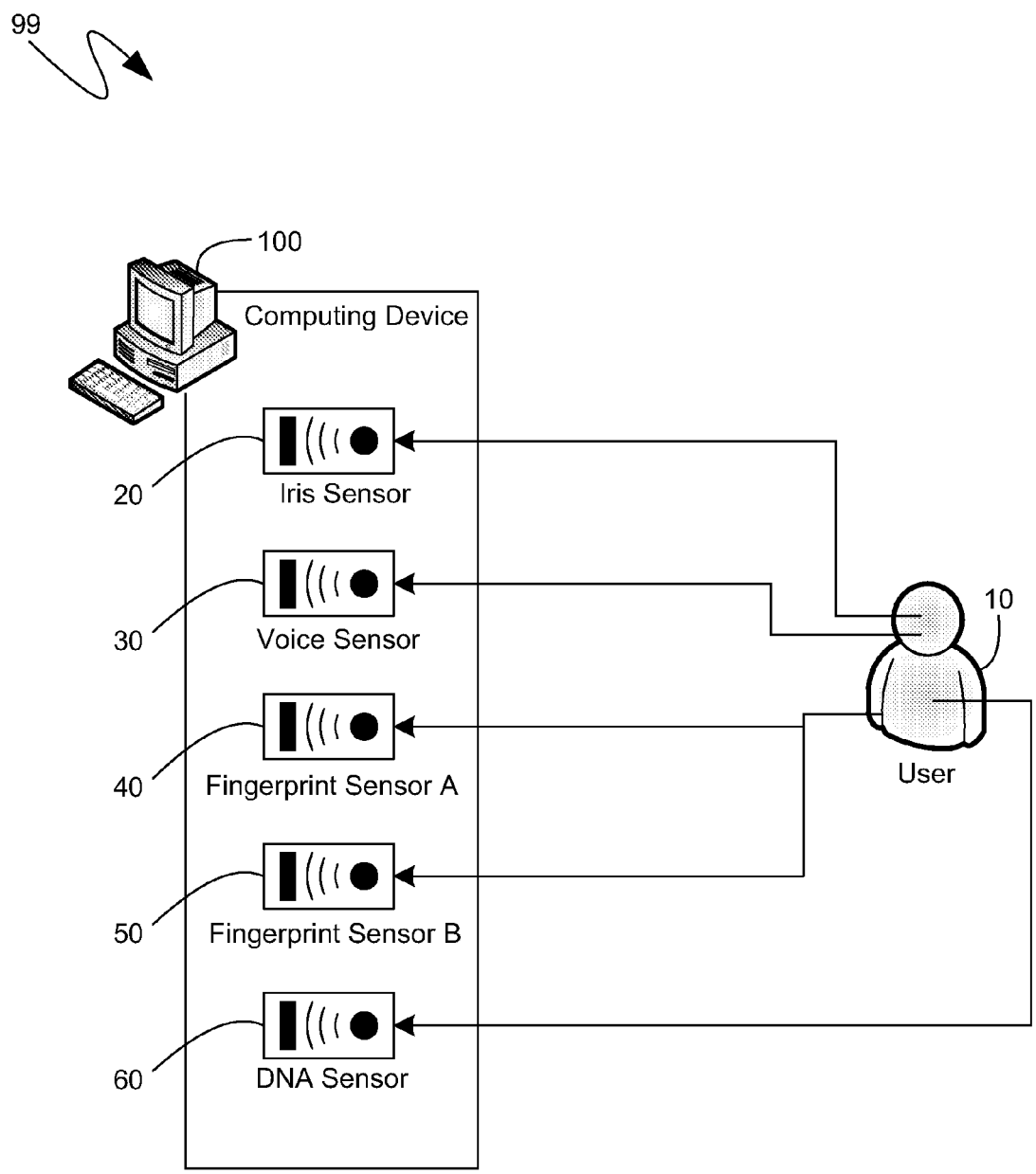
FIG. 1 is a block diagram of an exemplary computing device comprising multiple exemplary biometric sensors.

The following description relates to centralized components that can provide for the secure handling of biometric data. A biometric broker component can detect biometric sensors from which biometric data can be received and can establish biometric unit components for each such sensor. Factor-specific service providers can group multiple biometric unit components associated with the same type of sensor to enable the implementation of factor-specific mechanisms. Each of the individual biometric unit components can utilize plug-ins to provide for missing functionality, thereby enabling each biometric sensor, and associated functionality, to present a homogenous set of abilities. All such components can then be protected, such as by being part of the Trusted Computing Base. Additional protection can be provided by enabling client application programs to reference handles to biometric data, but not the biometric data itself.

While the mechanisms described make reference to specific components of computer-executable instructions, such references are merely meant to be exemplary and are provided for ease of illustration and explanation. The mechanisms described can be implemented through any number of components and can be divided among such components without impacting their operation. For example, the mechanisms described can be implemented as a single component, or, conversely, can be split across more components than described. Consequently, while the descriptions below will reference specific components having specific features and functionality, such references are merely of implementation details, and the mechanisms described are not so limited, and can be divided among any number of components and can be implemented in any number of equivalent ways.

Although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

Turning to FIG. 1, an exemplary system 99 is illustrated comprising a computing device 100 and a user 10 of the computing device. The user 10 can possess a potentially infinite number of biometric factors that can be quantified by various sensors that can be communicationally coupled to the computing device 100. Such biometric factors can act as identity mechanisms by which the user 10 can be granted access to protected computer-readable information or computing resources. More specifically, as will be known by those skilled in the art, computer-readable information, and computing resources, can be protected by a myriad of protection mechanisms, such as cryptographic mechanisms, operability mechanisms, and the like. Such mechanisms can provide access to the protected computer-readable information or computing resources upon the provision, by the user 10, of appropriate information. Such information can comprise passwords or other identifying information that can enable instructions executing on the computing device 100 to determine that the user 10 is who they claim to be, and to further determine whether such a user has sufficient rights to be granted access to the protected information or resources. Thus, more precisely, various biometric factors of the user 10 can be associated with one or more identities, and those identities can be referenced to determine whether the user should be granted access to protected information or resources.

The biometric data that the user 10 possesses is, essentially, limited only by the ability of sensors to detect such biometric data. For purposes of description, however, the computing device 100 is illustrated as comprising, or otherwise being communicationally coupled to, a variety of biometric sensors, including an iris sensor 20, a voice sensor 30, two fingerprint sensors 40 and 50, and a DNA sensor 60. The iris sensor 20 can comprise iris scanning capability to obtain data based on, or informed by, one or more of the user's irises. Similarly, the voice sensor 30 can comprise voice detection capability to obtain data based on, or informed by, the user's voice. The fingerprint sensors 40 and 50 can each, individually and independently, comprise fingerprint scanning capability that can obtain data based on, or informed by, one or more of the user's fingerprints. And the DNA sensor 60 can, likewise, comprise DNA sensing capabilities to obtain data based on, or informed by, the user's DNA. As indicated previously, such sensors are merely exemplary, as any sensor that can obtain data from the user's biology is equally applicable to the below descriptions.

Figure 2:
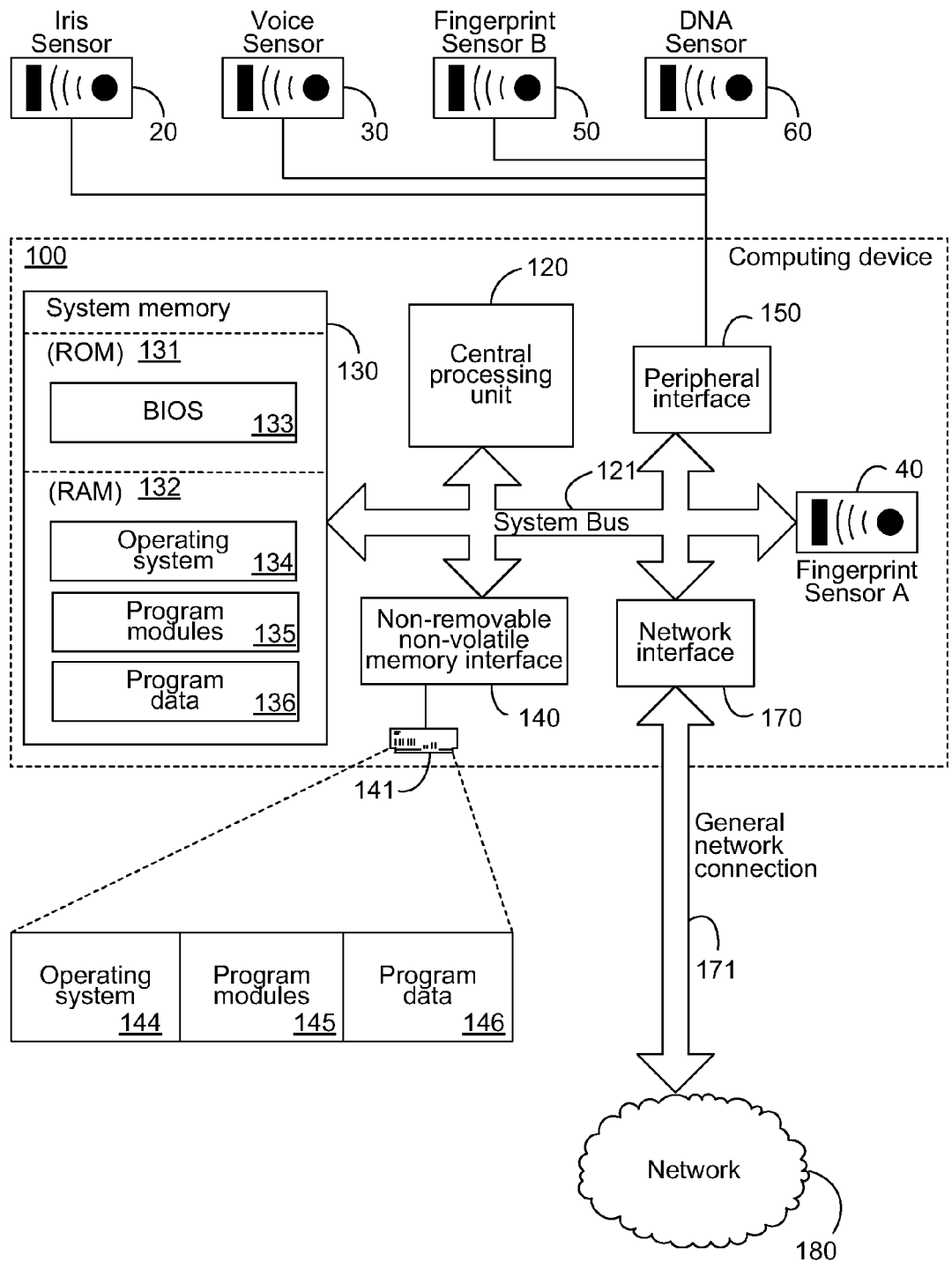
FIG. 2 is a block diagram of an exemplary computing device.

Turning to FIG. 2, the computing device 100 is illustrated in greater detail. More specifically, the exemplary computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, other program modules 135, and program data 136.

The computing device 100 may also include other removable/non-removable, volatile/nonvolatile computer storage media. By way of example only, FIG. 2 illustrates a hard disk drive 141 that reads from or writes to non-removable, non-volatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

Additionally, the computing device 100 may operate in a networked environment using logical connections to one or more remote computers. For simplicity of illustration, the computing device 100 is shown in FIG. 2 to be connected to a network 180 that is not limited to any particular network or networking protocols. The logical connection depicted in FIG. 2 is a general network connection 171 that can be a local area network (LAN), a wide area network (WAN) or other network. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

The computing device 100 can have integrated into it, or otherwise communicationally coupled with it, one or more biometric sensors, such as the sensors 20, 30, 40, 50 and 60. Sensors that are physically part of the computing device 100, such as a built-in fingerprint sensor 40 can be communicationally coupled directly to the system bus 121, such as through an appropriate interface. External sensors, such as the sensors 20, 30, 50, and 60, on the other hand, can be communicationally coupled to the system bus 121, and thus the other components of the computing device 100, through a peripheral interface 150. The peripheral interface 150 can include both wired and wireless interfaces and can support appropriate communicational protocols.

Figure 3:
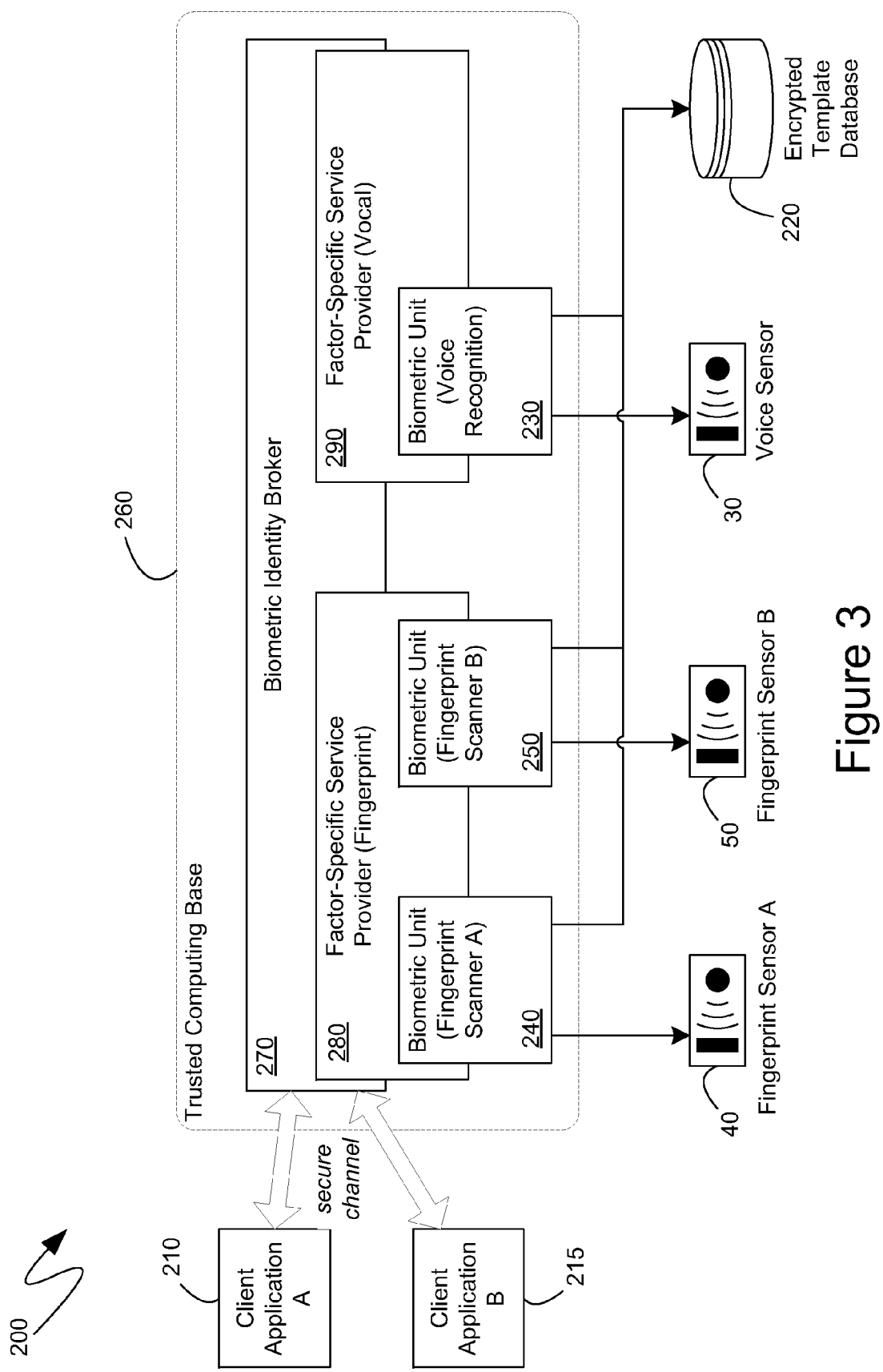
FIG. 3 is a block diagram of an exemplary centralized system for handling biometric data.

Access to the biometric sensors 20, 30, 40, 50 or 60 can be provided to computer-executable instructions executing on the CPU 120 through a centralized interface that can be provided by one or more components of computer-executable instructions that, in one embodiment, can be part of, or can be invoked by, the operating system 134. Turning to FIG. 3, the system 200 illustrates a biometric identity broker component 270, factor-specific service provider components 280 and 290 and biometric unit components 230, 240 and 250, which can all be part of the operating system 134, or the program modules 135 shown in FIG. 2. In one embodiment, to provide for the secure handling of biometric data, the biometric identity broker component 270, factor-specific service provider components 280 and 290 and biometric unit components 230, 240 and 250 can all be part of the Trusted Computing Base 260.

As will be known by those skilled in the art, a Trusted Computing Base (TCB) of a computing device, such as the computing device 100 described in detail above, can comprise a known and measurable state, or configuration, of various hardware and software elements of the computing device 100. More specifically, various hardware and software elements can be measured such that their current state or configuration yields a unique value. That unique value can be used to extend Platform Configuration Registers (PCRs) in a Trusted Computing Module (TCM). The PCRs, thereby, comprise values that will change if any of the measured hardware or software elements change. Information can be provided to the TCM such that the TCM will only release that information if the values of the PCRs are the same as they were when the computing device 100 was in a known, trusted state. If one of the measured hardware or software components was modified, such as by potentially malicious entities, the values of the PCRs will, by definition, be different and, consequently, whatever information was provided to the TCM will not be released and will, thereby, be protected.

Within the context of the biometric elements referenced herein, the presence of the biometric identity broker component 270, the factor-specific service provider components 280 and 290 and the biometric unit components 230, 240 and 250 within the TCB 260 can entail the measurement of the computer-executable instructions that comprise the biometric identity broker component 270, the factor-specific service provider components 280 and 290 and the biometric unit components 230, 240 and 250 and the extension of one or more PCRs of the TPM of the computing device 100 with those measured values. The values of the PCRs are, thus, dependent on the computer-executable instructions that comprise the biometric identity broker component 270, the factor-specific service provider components 280 and 290 and the biometric unit components 230, 240 and 250 such that, should any of the computer-executable instructions of those components change, then the values of the PCRs will likewise change. To protect biometric data from malicious entities, access to, for example, the encrypted template database 220, or any of the sensors 30, 40 and 50, shown in the system 200, can be conditioned upon the value of the PCRs that reflects a known good state of the computing device 100. Consequently, should any one of the biometric identity broker component 270, the factor-specific service provider components 280 and 290 or the biometric unit components 230, 240 and 250 change, such as through the activity of a malicious entity seeking to gain unauthorized access to biometric data, access to, for example, the encrypted template database 220, or the sensors 30, 40 and 50, can be denied since the values of the PCRs of the TPM of the computing device 100 will be different from those that reflect a known good state. In such a manner, the presence of the biometric identity broker component 270, factor-specific service provider components 280 and 290 and biometric unit components 230, 240 and 250 within the TCB 260 can provide a measure of security to the processing of biometric data.

Additional security can be added to the processing of biometric data through the use of secure communicational channels. As will be described further below, the biometric identity broker 270 can be a centralized, and also an exclusive, mechanism by which application programs, such as application programs 210 and 215 of system 200, can access and utilize biometric data and biometric sensors. In one embodiment, the application programs 210 and 215 can be part of the program modules 145 and program data 146 described above with reference to FIG. 2. Such application programs can, for various purposes, seek to utilize biometric data. For example, the client application 210 can be a logon application program or component, such as would traditionally be part of the operating system 134, which can utilize biometric data to identify a user 10 for logon purposes. Similarly, the client application 215 can be a timekeeping application that can utilize biometric data to identify a user 10 for purposes of clocking the user in, or out, such as to determine the amount of time that the user has been present within a given area or has been performing a particular task, or utilizing a particular resource.

The applications 210 and 215, and other clients of the biometric identity broker 270 can communicate with the biometric identity broker through secure channels, such as through secure remote procedure calls, or other similar mechanisms. As will be known by those skilled in the art, such secure channels can utilize various mechanisms, including encryption and authentication, to provide protection against interception, theft or replaying of the communications sent therein and can, thereby, protect against malicious entities seeking to gain unauthorized access to biometric information.

In one embodiment, the biometric identity broker 270 can be invoked by the operating system 134, such as during the booting of the computing device 100, or at a subsequent time when a sensor, such as sensors 30, 40 and 50, shown in FIG. 3, are made available to the computing device 100. For example, a biometric sensor, such as the sensors 30, 40 and 50, can conform to plug-and-play capabilities present in the operating system 134, and appropriate components, including the biometric identity broker 270, can be notified, and invoked, if appropriate, upon detection of a biometric sensor via such plug-and-play capabilities. Alternatively, in another embodiment, the biometric identity broker 270 can be invoked by the operating system 134, or one or more of its client applications, such as applications 210 and 215, when its functionality is requested by such a client application.

When the biometric identity broker 270 is first invoked, it can proceed to scan for and identify biometric sensors that are communicationally coupled to the computing device 100, including sensors that may be built-in to the computing device, such as the fingerprint sensor 40, and sensors that may be communicationally coupled through external communicational connections, such as the fingerprint sensor 50 or the voice sensor 30. In one embodiment, the biometric identity broker 270 can continually scan for such sensors during its execution while, in an alternative embodiment, it can be notified of newly added biometric sensors, added after the biometric identity broker was already invoked, via mechanisms such as plug-and-play.

Once the biometric identity broker 270 has identified at least one biometric sensor, it can instantiate, or build, a biometric unit component for each identified biometric sensor. As will be described in greater detail below, a biometric unit component can provide a common set of functionality irrespective of the abilities of the actual biometric sensor with which such a biometric unit component is associated. The common set of functionality provided can include the ability to utilize the biometric sensor with which the biometric unit is associated to collect biometric data and the ability to match collected biometric data to a template of biometric data. Thus, as shown in the system 200, each of the biometric sensors 30, 40 and 50 can be communicationally coupled to a biometric unit 230, 240 and 250, respectively, which can also, in turn, be communicationally coupled to a template database 220, which can be encrypted for security purposes.

To provide the above referenced security, after identifying biometric sensors, such as the sensors 30, 40 and 50, that are communicationally coupled to the computing device 100, the biometric identity broker 270 can obtain exclusive access to such sensors. Consequently, any other computer-executable instructions that may seek to access such sensors can obtain such access only through the biometric identity broker 270 and, in turn, the biometric units 230, 240 and 250 that the biometric identity broker created, or instantiated, for the sensors 30, 40 and 50, respectively. Thus, as shown, clients 210 and 215, which can include operating system components, application programs, utilities, or other computer-executable instructions, can only perform functions, with respect to biometric data, that are supported by the biometric identity broker 270. Such exclusivity of access can provide additional security, since potentially malicious computer-executable instructions cannot intercept, steal, or alter the underlying biometric data.

In one embodiment, the biometric identity broker 270 can provide clients, such as the clients 210 and 215, the ability to utilize biometric data. More specifically, the biometric identity broker 270 can utilize the biometric units it built for each detected biometric sensor to perform biometric-centric tasks with respect to the biometric data collected from such a sensor. Thus, the biometric identity broker 270 can utilize biometric units to capture biometric samples on behalf of the clients, match the captured samples to one or more biometric templates, and then inform the clients of an identity that is associated with the one or more biometric templates to which the captured sample was matched. For example, if the client application 210 was a logon process of the operating system 134, the client 210 could request that the biometric identity broker 270 monitor a particular biometric sensor, such as the built-in fingerprint sensor 40, capture any biometric samples provided via such a sensor, and inform the client of an identity associated with a template to which a captured sample was matched. Consequently, if a user 10 of the computing device 100, swiped their finger across the fingerprint sensor 40 built into the computing device, the biometric identity broker 270 could utilize the biometric unit 240 to capture the sample, compare the sample to biometric templates in the encrypted template database 220 and, if the captured sample matched a template, determine an identity associated with that template. The biometric identity broker 270 could then inform the client 210 of such an identity and the logon process could then log on the user 10 since, from the perspective of the logon process, the user 10 would have been perceived as having provided a valid identity, such as a user name and password, when, in actuality, such information would have been provided by the biometric identity broker.

As can be seen, during the provision of an identity, associated with a biometric sample, to a client, the client does not receive either the biometric sample, nor the biometric template. Instead, such biometric information is handled exclusively by computer-executable instructions that are part of the TCB 260. Other functionality, described further below, likewise does not allow biometric samples or templates to be exposed to computer-executable instructions other than those of the TCB 260. Instead, as will be described further below, the biometric identity broker 270 can provide clients, such as the client applications 210 and 215, with handles, or similar constructs, which the clients can utilize to reference biometric identities that are maintained by the biometric identity broker. Because clients cannot obtain direct access to biometric data, biometric templates or other biometric-centric information utilized to identify users, such as the user 10, based on their biometric characteristics, security for the user's biometric information can be maintained.

The biometric identity broker 270 can utilize the biometric units to capture multiple biometric samples on behalf of the clients and generate one or more templates from the captured samples. In such operations, the biometric identity broker 270 can provide feedback to its clients to enable them to display appropriate feedback to a user, such as the user 10. For example, if a client application 215 was a timekeeping application, such an application could provide a graphical user interface that could instruct a user 10 to first enroll some biometric data with which the user could subsequently be uniquely identified for purposes of the timekeeping application. As will be known by those skilled in the art, biometric templates seek to identify key aspects of a user's biology while filtering out noise inherent in the capture of data from such a biological aspect. Consequently, multiple samples are often required to generate a biometric template, with the exact number of samples required dependent upon the quality of the samples obtained and the nature of the biological aspect from which the template is being generated. The user interface of the application 215, therefore, could instruct the user 10 to, for example, slide a finger across the external fingerprint sensor 50. The biometric identity broker 270, utilizing the biometric unit 250, could then capture the sample and attempt to generate a biometric template. If additional samples are required to generate the biometric template, the biometric identity broker 270 can inform the application 215 accordingly. The application 215 can then utilize its graphical user interface to, for example, request that the user slide the same finger again across the external fingerprint sensor 50. Once a template has been generated by the biometric unit 250, the biometric identity broker 270 can inform the client 215, and the client 215 can then, in turn, inform the user 10. In such a manner, client applications of the biometric identity broker 270 can provide the user interface and handle communications with the user 10, while the biometric identity broker can merely provide the relevant information regarding, for example, biometric sample acquisition or biometric template generation.

In addition to providing mechanisms by which clients, such as the client applications 210 and 215, can receive identities associated with templates to which received biometric samples were matched, and mechanisms by which clients can receive information relevant to their interaction with a user 10, such as, for example, during biometric template generation, the biometric identity broker 270 can, additionally, provide mechanisms for the optimization and maintenance of biometric-centric data. More specifically, the biometric identity broker 270 can enable client applications to delete templates, associate templates with particular identities relevant to that client application program, list all currently existing templates associated with that program, and other like optimization and maintenance tasks.

The biometric identity broker 270, as indicated previously, can provide a handle, or other similar construct, for a user's biometric identity, template, data, or other like biometric information, to enable clients, such as the client application programs 210 and 215, to reference biometric elements without having any direct control of such elements. In one embodiment, the handle provided by the biometric identity broker 270 can be persistent such that the client can utilize the handle in the same manner as the client would traditionally utilize the biometric-centric data itself, including, for example, providing the handle to other application programs or components to enable them to reference the biometric-centric data associated with the handle.

In one embodiment, multiple different user identities, or classes or types of identities, can be associated with a single biometric factor by the biometric identity broker 270. More specifically, if multiple sensors, each directed to a particular biometric factor, are communicationally connected to the computing device 100, then each sensor can be associated with an exclusive group, type, or class, of identities. For example, the exemplary system 200 of FIG. 3 comprises an internal fingerprint sensor 40 and an external fingerprint sensor 50. Both the sensors 40 and 50 can be directed to the capture of the same biometric factor, namely, in the present example, fingerprints. However, because each sensor can have an independent biometric unit associated with it, namely biometric units 240 and 250, respectively, the biometric input provided to each sensor can be utilized, by those biometric units, to reference different templates within the encrypted template database 220.

Continuing with the above examples, the internal fingerprint sensor 40 can be utilized by the logon application 210 to, for example, log users, such as the user 10, onto the computing device 100. The external fingerprint sensor 50, on the other hand, can be utilized by the timekeeping application 215 to enable users to check into and out of the timekeeping application. More generically, a single piece of biometric data, such as, in the present example, the user's fingerprint, can be associated with multiple simultaneous classes, groups, or types of identities. In the present example, the user's fingerprint can be associated with a class of identities that are linked to, or otherwise correlate to, user accounts on the computing device 100, and the user's fingerprint can, simultaneously, be associated with a class of identities that are linked to, or otherwise correlate to, user identities within the context of a timekeeping application. The same user 10, therefore, can have an account on the computing device 100 that they can log into, and can also be a user of the timekeeping application 215.

To enable the same biometric factor of the user 10 to be utilized for both purposes, the templates stored in the encrypted template database 220 can be divided such that, for example, sample-to-template matches by the biometric unit 240 associated with the built-in fingerprint sensor 40 can use templates associated with logon accounts, while sample-to-template matches by the biometric unit 250 associated with the external fingerprint sensor 50 can use templates associated with timekeeper application accounts. More specifically, different classes, groups, or types of identities can have different forms of auxiliary information associated with them. Thus, in the present example, the templates referenced by the biometric unit 240 to determine if biometric data received by the built-in fingerprint sensor 40 matches any of them can be associated with a user account class of identities. Such identities can have auxiliary data associated with user accounts, such as user names and passwords that would be provided by the user 10 in a manual logon situation. Such auxiliary data can be maintained either within the encrypted template database 220, or by the logon application 210 itself. In a similar manner, the templates referenced by the biometric unit 240 to determine if biometric data received by the external fingerprint sensor 50 matches any of them can be associated with a timekeeping class of identities. Such identities can have auxiliary data associated with the timekeeping application 215, such as user identifying information utilized within the timekeeping application itself. In some embodiments, such auxiliary data may be empty, or otherwise null, if it is not relevant to the particular class of identity.

In another embodiment, biometric-centric data associated with, or utilized with, various types, classes, or groups of identities, can be accessed, or even edited, in accordance with access policies that can be independently set on a per-class basis. For example, returning to the above example of utilizing the same biometric data to both enable logons to the computing device 100, and to enable checking into and out of a timekeeping application, client applications, such as the logon application 210 and the timekeeping application 215, can be assigned differing access control policies with respect to the biometric-centric data. For example, the user account class of identities can have an access control policy that enables users with administrator rights to access and modify biometric-centric information for any user of the computing device 100, while users with lesser rights may only be allowed to access and modify their own biometric-centric information. Conversely, the class of identities associated with the timekeeping application 215 can have an access control policy that enables whatever user installed the timekeeping application to access and modify biometric-centric information for any other user of the timekeeping application, even if the user that installed the timekeeping application does not have administrator rights. Thus, a user with administrator rights could utilize an application, such as the logon application 210, to, for example, delete biometric templates associated with users of the computing device 100, or edit the auxiliary information associated with such templates, such as, for example, a user name or password. Similarly, a user that installed the timekeeping application 215 can utilize such an application to request that the biometric identity broker 270 create a new template for a new user of the timekeeping application, or edit information associated with templates associated with the timekeeping application, such as a user's name, badge number, department, or like information. As used in these descriptions, therefore, the term "biometric-centric information" means any information whose meaning to one or more processes derives from its association with biometric information collected through biometric sensors. As such, the term "biometric-centric information" includes information such as biometric data, biometric templates, identities associated with the biometric templates, and auxiliary information linked to the biometric templates.

To manage such multiple identities associated with a single biometric factor, the biometric identity broker 270 can create, or instantiate, one or more factor-specific service providers, such as the factor-specific service providers 280 and 290. Each factor-specific service provider can exclusively control biometric units associated with sensors directed to the same type of biometric factor. Thus, as shown in the exemplary system 200 of FIG. 3, the factor-specific service provider 280 can be specific to fingerprint biometric factors, and can provide services to all biometric units associated with fingerprint sensors, such as biometric units 240 and 250. Similarly, the factor-specific service provider 290 can be specific to vocal biometric factors, and can provide services to all biometric units associated with voice-based sensors, such as the biometric unit 230 associated with the voice sensor 30. As can be seen, a factor-specific service provider can be created, or instantiated, by the biometric identity broker 270 even if only a single biometric sensor of that type has been detected. In one embodiment, computer-executable instructions for specific types of factor-specific service providers can be pre-existing and the biometric identity broker 270 can merely select from among them to instantiate a particular type of factor-specific service provider, as needed. In an alternative embodiment, common functionality shared by many types of factor-specific service providers can be provided by pre-existing computer-executable instructions, and the biometric identity broker 270 can set configurable options of the factor-specific service providers.

As indicated previously, factor-specific service providers can provide services that may be factor-specific, thereby enabling the coordinated use of multiple biometric sensors all directed to a common factor. Thus, returning to the above example, if the internal fingerprint sensor 40 were to be used to, for example, log users onto a computing device, such as the computing device 100, and the external fingerprint sensor 50 were to be used to, for example, enable users to check into and out of a timekeeping application, then the factor-specific service provider for fingerprints 280 could direct the biometric unit 240 to match samples received via the sensor 40 to templates associated with users of the computing device 100 and direct the biometric unit 250 to match samples received via the sensor 50 to templates associated with identities relevant to the timekeeping application. Alternatively, all biometric units, such as the biometric units 240 and 250 could search the same collection of templates in the encrypted template database 220 for a match to the sample received by their respective associated sensors, namely sensors 40 and 50. Once a matching template is identified, the factor-specific service provider for fingerprints 280 can determine, if multiple identities are associated with the identified template, which identity is to be provided to a client application given the sensor through which the biometric sample was received.

Factor-specific service providers can also arbitrate among multiple clients that may simultaneously be waiting for biometric input. Returning to the above example of a logon client 210 and a timekeeping client 215, the timekeeping client may be continuously ready to receive biometric input and, accordingly, enable a user to check into or out of the timekeeping application, while the logon client 210 may be ready to receive biometric input only during a logon process. If the operating system 134 is executing the timekeeping client 215 in the background while simultaneously executing the logon client 210 waiting for a user to log onto the computing device 100, there can be two clients simultaneously waiting for biometric input. The determination of which client receives an identity associated with any received biometric samples can be performed by the factor-specific service provider.

In the above example, the factor-specific service provider for fingerprints 280 can determine that the identity associated with a template to which a user fingerprint sample was matched can be provided first to the logon client 210 based on, for example, the fact that the logon client 210 possessed window focus at the time that the fingerprint sample was received. Alternatively, the factor-specific service provider for fingerprints 280 can determine to provide the identity associated with the template to which the sample was matched to the timekeeping application 215 due to the fact that the sample was received on the external fingerprint sensor 50. As will be recognized by those skilled in the art, other factors beyond window focus and receiving sensor can be utilized to determine which of multiple clients simultaneously awaiting data receive the identity associated with a template to which a sample was matched. For example, the factor-specific service providers can base such decisions on the identity associated with the template to which the sample was matched, the context in which the sample was received, and other similar factors.

Because arbitration among multiple clients simultaneously awaiting data can be performed by the factor-specific service providers, different biometric factors can have different mechanisms for performing such arbitration. For example, the factor-specific service provider for fingerprints 280 can base such arbitration decisions on the specific sensor that received the sample, while the factor-specific service provider for vocal samples 290 can base such arbitration on the window focus in effect at the time the sample is received.

Factor-specific service providers can, in another embodiment, also provide unexpected sample handling capabilities. For example, a user 10 could swipe their finger across the internal fingerprint sensor 40 at a time when no client application has informed the biometric identity broker 270 that it is awaiting biometric input. In such a case, a factor-specific service provider, such as the factor-specific service provider for fingerprints 280, can inform a default application client that can, previously, have registered itself with the biometric identity broker 270 to be the client that is notified if an unexpected biometric sample is received. As above, because such unexpected sample handling can be performed by the factor-specific service providers, different default application clients can be registered for each type of biometric factor for which a detected sensor has an associated biometric unit. Thus, for example, the factor-specific service provider for fingerprints 280 can direct unexpected fingerprint samples to a help application that can offer the user assistance in registering their fingerprint, while the factor-specific service provider for vocal samples 290 can direct unexpected vocal samples to a voice-centric application, especially if only one such application has registered itself as a client of the biometric identity broker 270.

Figure 4:
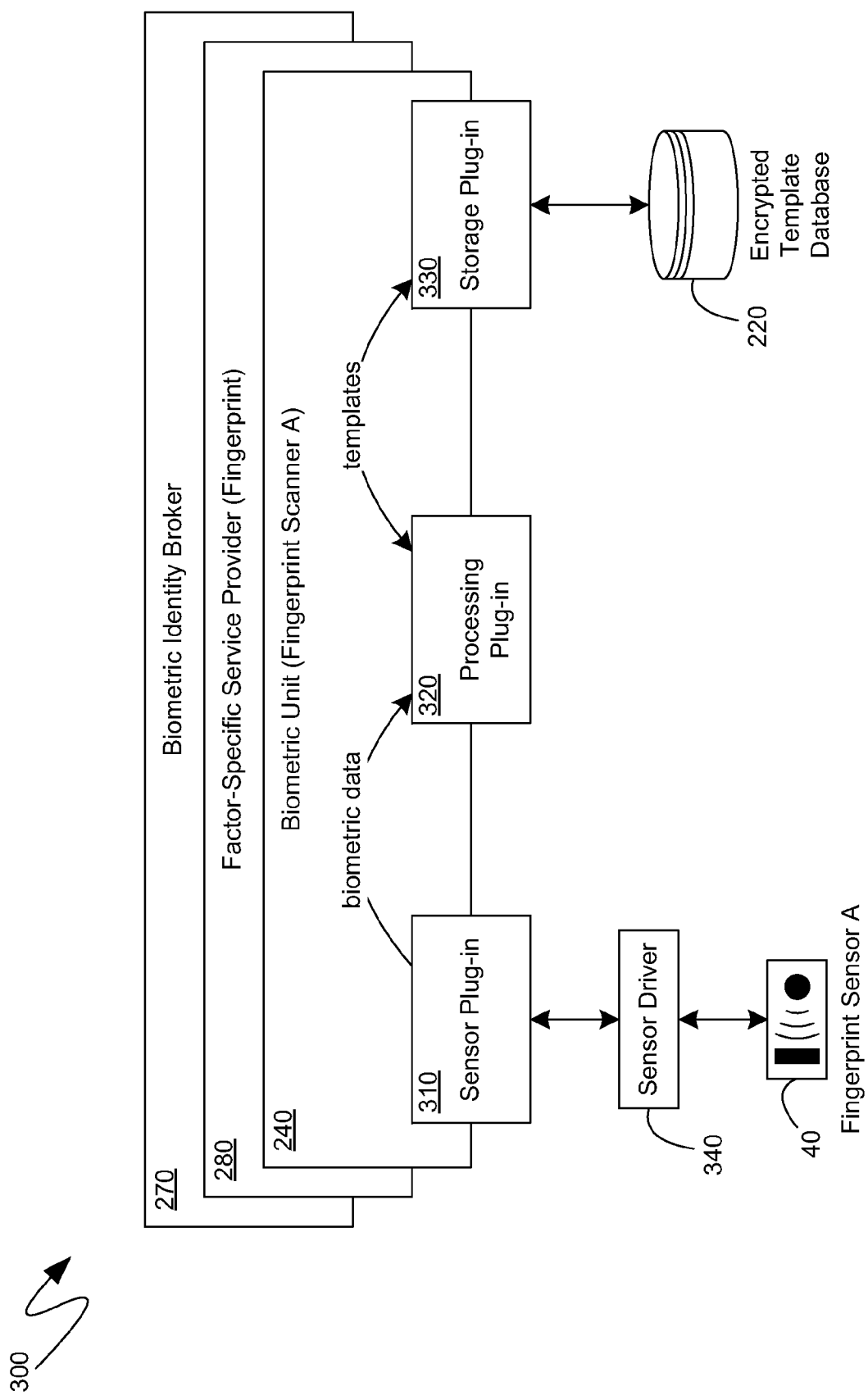
FIG. 4 is a block diagram of another aspect of an exemplary centralized system for handling biometric data.

Turning back to the biometric units, such as the biometric units 230, 240 and 250 of the exemplary system of FIG. 3, each biometric unit, for ease of implementation, can utilize one or more plug-in components to aid in its operation and interface with biometric sensors of varying capabilities. Turning to FIG. 4, the exemplary system 300 illustrates the biometric unit 240 for the fingerprint sensor 40 in greater detail. More specifically, the biometric unit 240 can interface with the fingerprint sensor 40 through a sensor driver 340 that can be specifically designed for the fingerprint sensor 40, and a sensor plug-in 310 that can provide more a universal sensor interface for the biometric unit. Similarly, the biometric unit 240 can interface with the encrypted template database 220 through a storage plug-in 330. The biometric unit 240 can also utilize a processing plug-in 320 through which the biometric unit 240 can access proprietary processing capabilities, such as may be provided by the sensor 40, computer-executable instructions associated with the sensor 40, or other like external sources of processing capable of matching biometric samples received via the sensor 40 to templates stored in the encrypted template database 220.

The sensor driver 340, as will be known by those skilled in the art, can comprise computer-executable instructions specifically designed to enable communication between the sensor 40 and the computing device 100. Traditionally, such a sensor driver 340 can be provided by the manufacturer of the sensor 40, and can, thereby, take advantage of any specific nuances of the sensor. The sensor plug-in 310, on the other hand, can be provided either by the manufacturer of the sensor 40 or another entity. In one embodiment, a default sensor plug-in 310 can be provided in conjunction with the biometric identity broker 270.

The sensor plug-in 310 can provide a baseline functionality with respect to the sensor 40 such that all sensors, irrespective of their exact capabilities, can be communicationally coupled to a biometric unit 240 that can filter out such sensor-specific behavior and can provide a common baseline level of functionality. Thus, for example, the sensor plug-in 310 can utilize the sensor driver 340 to obtain biometric samples from the sensor 40. As shown in the exemplary system 300 of FIG. 4, once obtained, the data from the biometric samples can be passed by the biometric unit 240, from the sensor plug-in 310 to the processing plug-in 320 for processing, such as the utilization of the obtained biometric sample in creating a template, or the matching of the obtained biometric sample to already existing templates.

Other baseline functionality that can be offered by the sensor plug-in 310 can include various maintenance functions with respect to the sensor 40. For example, the sensor plug-in 310 can include functionality for verifying the communicational connection with the sensor 40, resetting the sensor, verifying whether the sensor is on or off, retrieving the current status of the sensor, and other like functionality.

Once a biometric sample has been received from the sensor 40 by the sensor plug-in 310, the biometric unit 240 can pass that sample to the processing plug-in 320. In one embodiment, the processing plug-in 320 can comprise computer-executable instructions provided by entities specializing in the methods and mechanisms by which biometric data is collected into templates or compared to existing templates. Because such methods and mechanisms are continually improving, the structure of the biometric unit 240 and the processing plug-in 320 allows for the replacement of an existing processing plug-in with a newer, more advanced, variant, without change to the above described operations or components.

If the biometric data acquired from the sensor plug-in 310 was provided to the processing plug-in 320 for purposes of generating a biometric template, then the processing plug-in can request additional biometric data from the biometric unit 240 until it has a sufficient amount of biometric samples from which a reliable biometric template can be generated. As indicated previously, the biometric unit 240 can forward requests for additional biometric samples, for purposes of template generation, on to the relevant client application via the biometric identity broker 270. Once the processing plug-in 320 has generated a biometric template, the biometric unit 240 can provide such a template to the storage plug-in 330 for storage in the encrypted template database.

If, on the other hand, the biometric data acquired from the sensor plug-in 310 was provided to the processing plug-in 320 for purposes of matching it to an existing template, the biometric unit 240 can provide templates from the storage plug-in 330 to the processing plug-in so as to enable the processing plug-in to compare them to the received biometric sample and determine if any are a match.

In addition to providing template generation and template matching functionality, the processing plug-in 320 can also provide various optimization and informational functionality, such as providing status updates, information regarding one or more templates currently being generated, data format options, and other similar functionality.

The storage plug-in 330, as described, can provide an interface to the encrypted template database 220 to enable storage of generated templates in a secure manner, and to enable retrieval of previously generated, and stored, templates. In one embodiment, the computer-executable instructions that comprise the storage plug-in 330 can be provided independently of the biometric identity broker 270, and can, thereby, utilize proprietary storage and encryption methodologies. In an alternative embodiment, however, a default storage plug-in 330 can be provided with the biometric identity broker 270.

In addition to providing storage and retrieval functionality to the biometric unit 240, the storage plug-in 330 can also provide storage optimization and maintenance functionality. For example, the storage plug-in 330 can enable the biometric unit 240 to delete specific templates from the database 220, create a new database, delete an existing database, and obtain information about the database, such as the quantity of templates stored. Other like functionality can also be provided.

As can be seen, the biometric unit 240 can act as an intermediary, obtaining biometric data from the sensor plug-in 310 and passing it to the processing plug-in 320 for either template generation or template matching. In the case of template generation, the biometric unit 240 can further provide the generated templates to the storage plug-in 330 from the processing plug-in 320 when they have been generated, while, in the case of template matching, the biometric unit can provide templates from the storage plug-in to the processing plug-in to enable the processing plug-in to compare them to the received biometric sample. As such, the biometric unit 240 can, in one embodiment, comprise standardized computer-executable instructions that can have specific options or functionality set by the biometric identity broker 270 when the biometric unit is created upon detection of a sensor, such as the sensor 40. Such specific options or functionality can include the plug-ins utilized, since, as indicated previously, default and customized plug-ins can be supported by the biometric unit 240.

Figure 5:
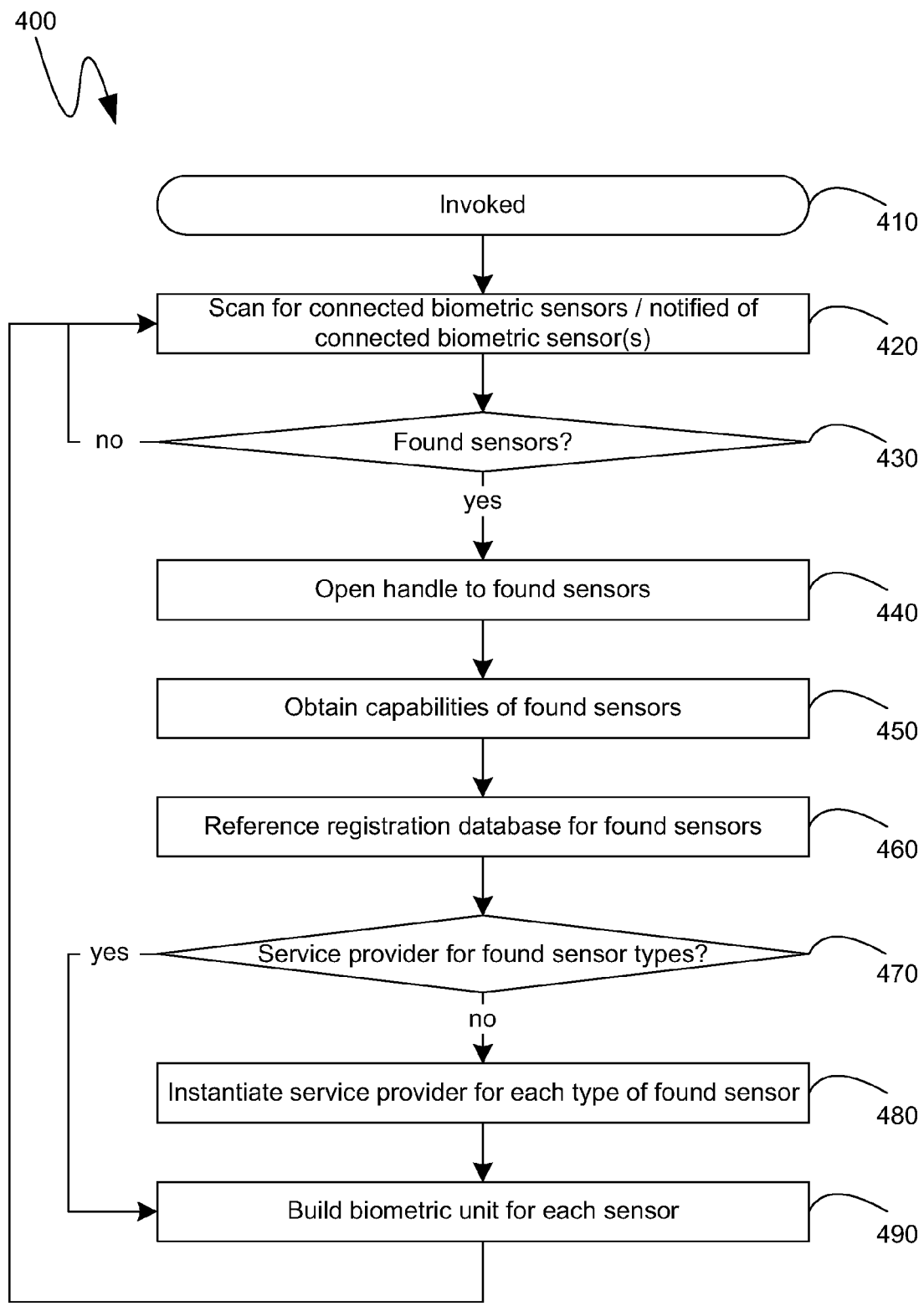
FIG. 5 is a flow diagram of the operation of an exemplary centralized system for handling biometric data.

The overall operation of the biometric identity broker 270 is described in further detail with reference to the flow diagram 400 of FIG. 5. Turning to FIG. 5, as described above, processing can commence when the biometric identity broker 270 is invoked at step 410, such as during a booting process, when a sensor is detected, or when otherwise required. Subsequently, at step 420, the biometric identity broker 270 can scan for biometric sensors that are communicationally coupled to the computing device 100. Alternatively, as also described previously, the biometric identity broker 270 can utilize mechanisms, such as plug-and-play mechanisms, to be informed or notified when a biometric sensor is connected. If no biometric sensors were found, as determined at step 430, then processing can return to step 420.

However, if biometric sensors were identified at step 420, as determined at step 430, then the biometric identity broker 270 can, at step 440, open a handle to the sensors that were found or of which the biometric identity broker was notified. As will be known by those skilled in the art, the opening of such a handle can enable the biometric identity broker 270 to establish a communicational and control connection to the sensor. As indicated previously, in one embodiment, such a connection can be an exclusive connection. Subsequently, at step 450, the biometric identity broker 270 can obtain the capabilities of the found sensors, such as by polling them or other equivalent operation. The capabilities of the found sensors can inform the subsequent creation of a biometric unit, at step 490, as will be described below. After obtaining the capabilities of the sensors at step 450, the biometric identity broker 270 can, optionally, at step 460, reference external data sources, such as a registration database, to determine if any pre-existing information exists regarding the found sensors, such as an identification of a previously created biometric unit for the sensor.

Prior to creating the biometric unit at step 490, the biometric identity broker 270 can, at step 470, determine if a factor-specific service provider has been instantiated for the type of found sensor. If such a factor-specific service provider is already executing, then processing can proceed to step 490. Alternatively, if, at step 470, it is determined that no such factor-specific service provider has been instantiated, the biometric identity broker 270 can, at step 480, instantiate, or otherwise build, an appropriate factor-specific service provider for the type of sensor found.

At step 490, then, the biometric identity broker 270 can create, or otherwise instantiate, a biometric unit for each of the found sensors. As indicated previously, such a biometric unit can comprise common functionality that utilizes sensor, processing and storage plug-ins. Thus, in one embodiment, the creation of the biometric unit, at step 490, can comprise the determination, by the biometric identity broker 270, of the specific plug-ins to be utilized, such as, for example, whether to utilize a default plug-in or whether to utilize a plug-in specific to the found sensor, or which otherwise takes advantage of functionality provided by, or with, the found sensor. After the creation of such a biometric unit, processing can return to step 420.

Figure 6:
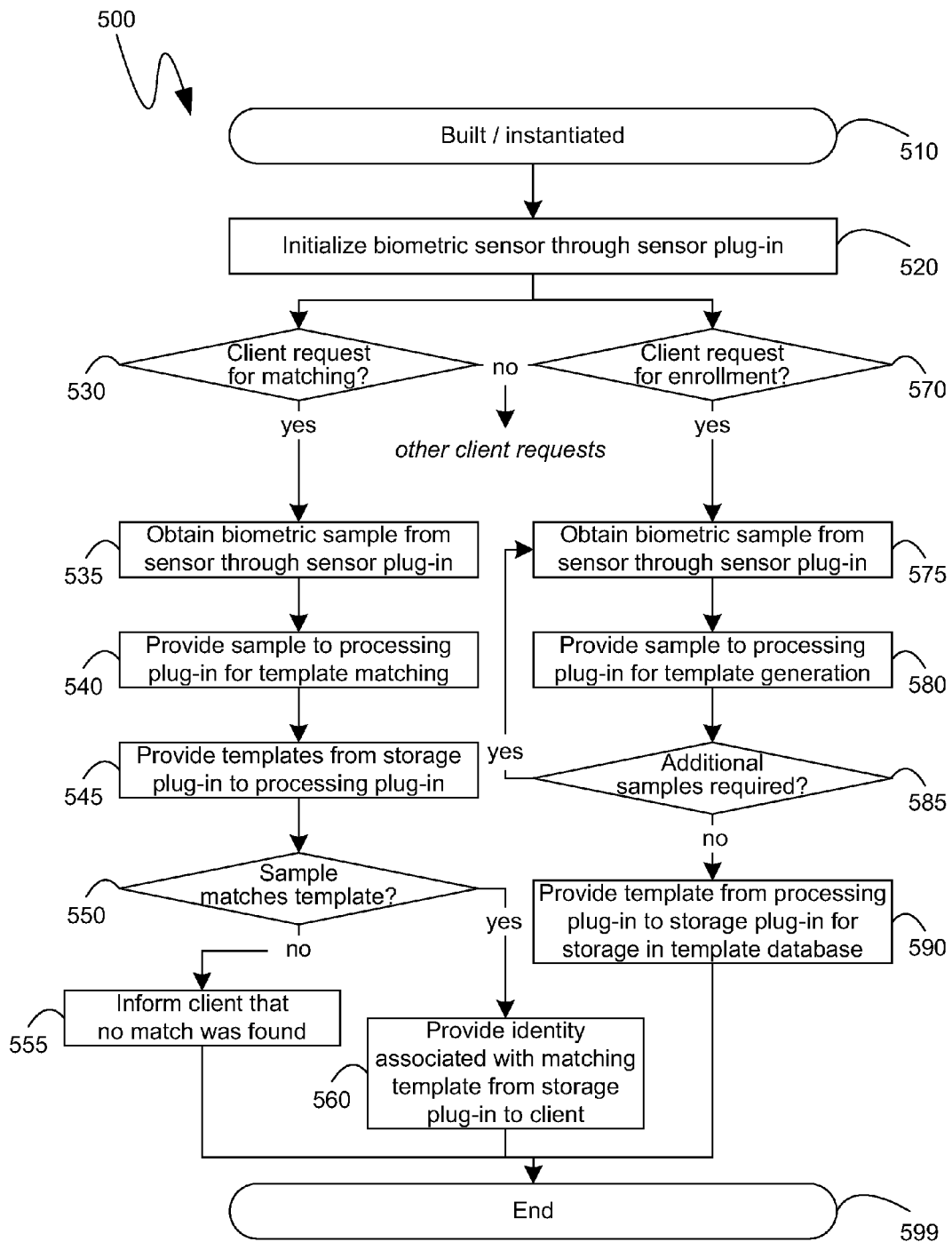
FIG. 6 is a flow diagram of exemplary aspects of the operation of components of an exemplary centralized system for handling biometric data.

An exemplary operation of a created biometric unit, such as the biometric unit 240, described in detail above, is shown with reference to flow diagram 500 of FIG. 6. Turning to FIG. 6, the biometric unit can be built, or otherwise instantiated, at step 510. Subsequently, at step 520, the biometric unit can initialize the biometric sensor through a sensor plug-in, such as the sensor plug-in 310, described in detail above. Such an initialization can comprise the establishment of communicational parameters and other like maintenance functions.

The biometric unit can, after step 520, be responsive to client requests or information received from the biometric sensor which it initialized at step 520. For purposes of illustration, two exemplary functions are shown in flow diagram 500. Specifically, at steps 530 and 570, the biometric unit can monitor client requests. If the client requests that a biometric sample provided to the sensor is to be matched to existing templates, such a request can be recognized at step 530 and processing can proceed therefrom. Similarly, if the client requests that a biometric template be created, such a request can be recognized at step 570, and processing can proceed therefrom. As illustrated in the flow diagram 500, if the client requests other functions, such functions can be provided by the biometric unit, though they are not specifically illustrated in FIG. 6.

Turning back to step 530, if the client requests that a received sample be matched to existing templates, the biometric unit can, at step 535, obtain a biometric sample from the biometric sensor via the sensor plug-in. Subsequently, at step 540, the biometric sample obtained at step 535 can be passed to the processing plug-in for template matching. To enable the processing plug-in to match the biometric sample to templates, the templates from the template database 220 can be provided to the processing plug-in from the storage plug-in at step 545. Subsequently, at step 550, a determination can be made as to whether the biometric sample matches any template. If no such match was found, the biometric unit can, at step 555, inform the client, through the biometric identity broker 270, that no template was found to match the biometric sample that was provided to the biometric sensor. However, if a match was found, then at step 560, the biometric unit can provide one or more identities associated with that template to the client, by providing the identity information to the biometric identity broker 270 and the factor-specific service provider associated with the biometric unit. Relevant processing can then end at step 599.

Similarly, if the client requests that a new template be generated, such as by requesting that a new user's biometrics be enrolled, such a request can be detected at step 570. Subsequently, at step 575, the biometric unit can obtain a biometric sample from the sensor by utilizing the sensor plug-in. At step 580, the biometric unit can provide the obtained biometric sample to the processing plug-in to enable it to generate the template. If, at step 585, the processing plug-in requests additional samples from which to generate the template, processing can return to step 575 and another biometric sample can be received by way of the sensor plug-in and can be provided to the processing plug-in at step 580. If, however, at step 585, no additional samples are required, and the processing plug-in can generate a template, then, at step 590, the biometric unit can provide the generated template to the storage plug-in to store the template in the encrypted template database 220. Relevant processing can then end at step 599.

As can be seen from the above descriptions, mechanisms for providing a common and secure interface to biometric data have been provided. In view of the many possible variations of the subject matter described herein, we claim as our invention all such embodiments as may come within the scope of the following claims and equivalents thereto.

I claim:

1. One or more computer-readable memory comprising computer-executable instructions for providing biometric identity services to one or more clients, the computer-executable instructions directed to steps comprising:
   receiving information regarding a first biometric sensor;
   obtaining exclusive control over the first biometric sensor;
   instantiating a first factor-specific service provider based on a biometric sensor type of the first biometric sensor, wherein all biometric sensors of a same biometric sensor type as the first biometric sensor will interface exclusively with the first factor-specific service provider;
   creating a first biometric unit, exclusively controlled by the first factor-specific service provider, the first biometric unit comprising computer-executable instructions for: receiving biometric samples from the first biometric sensor, providing the received biometric samples to computer-executable instructions directed to processing received biometric samples, providing, from a template database, biometric templates to the computer-executable instructions directed to processing received biometric samples, and storing, in the template database, biometric templates generated by the computer-executable instructions directed to processing received biometric samples;
   receiving information regarding a second biometric sensor that is independent of the first biometric sensor;
   instantiating a second factor-specific service provider, different than the first factor-specific service provider, only if the second biometric sensor is of a different biometric sensor type than the first biometric sensor;
   creating a second biometric unit, exclusively controlled by the second factor-specific service provider, for receiving biometric samples from the second biometric sensor, only if the second biometric sensor is of a different biometric sensor type than the first biometric sensor; and
   creating a second biometric unit, exclusively controlled by the first factor-specific service provider, for receiving the biometric samples from the second biometric sensor, only if the second biometric sensor is of the same biometric sensor type as the first biometric sensor.

2. The computer-readable memory of claim 1, wherein the first biometric unit comprises: a sensor plug-in comprising computer-executable instructions for communicating with the first biometric sensor, a processing plug-in comprising the computer-executable instructions of the first biometric unit that are directed to processing received biometric samples, and a storage plug-in comprising computer-executable instructions for interfacing with the template database.

3. The computer-readable memory of claim 1, wherein the computer-executable instructions for providing the biometric identity services to the one or more clients are part of a trusted computing base of a computing device on which the computer-executable instructions for providing the biometric identity services to the one or more clients are executed.

4. The computer-readable memory of claim 1, comprising further computer-executable instructions directed to: receiving, from a requesting client of the one or more clients, a request to collect a biometric sample and determine an identity associated with it; receiving, from a biometric unit associated with a biometric sensor that received the biometric sample, an identity associated with a template to which the biometric sample was matched by the biometric unit; and providing the identity to the requesting client.

5. The computer-readable memory of claim 1, comprising further computer-executable instructions directed to: receiving, from a requesting client of the one or more clients, a request to generate a biometric template; receiving a request for additional biometric samples from a biometric unit associated with a biometric sensor that received a biometric sample from which the biometric template is to be, in part, generated; and providing the request for the additional biometric samples to the requesting client.

6. The computer-readable memory of claim 1, wherein the first factor-specific service provider comprises computer-executable instructions for selecting a client, from among two or more clients simultaneously awaiting identities based on biometric samples, to receive an identity associated with a template to which a provided biometric sample was matched by a biometric unit associated with a biometric sensor that obtained the biometric sample.

7. The computer-readable memory of claim 1, wherein the first factor-specific service provider comprises computer-executable instructions for: receiving a template to which a provided biometric sample was matched by a biometric unit associated with a biometric sensor that obtained the biometric sample, the template being associated with multiple identities; selecting an identity, from among the multiple identities, based on the biometric sensor that obtained the biometric sample; and providing the selected identity to a client, from among the one or more clients.

8. The computer-readable memory of claim 7, wherein each of the multiple identities belong to a different identity class, and wherein further each of the different identity classes are associated with unique access rights provided to the one or more clients.

9. The computer-readable memory of claim 1, comprising further computer-executable instructions for selecting an unhandled event client, from among the one or more clients, to receive information associated with a biometric sample provided during a time when none of the one or more clients were awaiting the biometric sample.

10. The computer-readable memory of claim 1, comprising further computer-executable instructions for providing, to the one or more clients, persistent handles to biometric-centric information comprising the biometric templates.

11. A method of providing biometric identity services to one or more clients executing on a computing device that is communicationally coupled to a first biometric sensor and a second biometric sensor, the method comprising the steps:
receiving information regarding the first biometric sensor;
obtaining exclusive control over the first biometric sensor;
instantiating, on the computing device, a first factor-specific service provider based on a biometric sensor type of the first biometric sensor, wherein all biometric sensors of a same biometric sensor type as the first biometric sensor will interface exclusively with the first factor-specific service provider;
creating, on the computing device, a first biometric unit, exclusively controlled by the first factor-specific service provider, the first biometric unit comprising computer-executable instructions for: receiving biometric samples from the first biometric sensor, providing the received biometric samples to computer-executable instructions directed to processing received biometric samples, providing, from a template database, biometric templates to the computer-executable instructions directed to processing received biometric samples, and storing, in the template database, biometric templates generated by the computer-executable instructions directed to processing received biometric samples;
receiving information regarding the second biometric sensor, the second biometric sensor being independent of the first biometric sensor;
instantiating, on the computing device, a second factor-specific service provider, different than the first factor-specific service provider, only if the second biometric sensor is of a different biometric sensor type than the first biometric sensor;
creating, on the computing device, a second biometric unit, exclusively controlled by the second factor-specific service provider, for receiving biometric samples from the second biometric sensor, only if the second biometric sensor is of a different biometric sensor type than the first biometric sensor; and
creating, on the computing device, a second biometric unit, exclusively controlled by the first factor-specific service provider, for receiving the biometric samples from the second biometric sensor, only if the second biometric sensor is of the same biometric sensor type as the first biometric sensor.

12. The method of claim 11, wherein the first biometric unit comprises: a sensor plug-in comprising computer-executable instructions for communicating with the first biometric sensor, a processing plug-in comprising the computer-executable instructions of the first biometric unit that are directed to processing received biometric samples, and a storage plug-in comprising computer-executable instructions for interfacing with the template database.

13. The method of claim 11, further comprising the steps of: receiving, from a requesting client of the one or more clients, a request to collect a biometric sample and determine an identity associated with it; receiving, from a biometric unit associated with a biometric sensor that received the biometric sample, an identity associated with a template to which the biometric sample was matched by the biometric unit; and providing the identity to the requesting client.

14. The method of claim 11, wherein the first factor-specific service provider selects a client, from among two or more clients simultaneously awaiting identities based on biometric samples, to receive an identity associated with a template to which a provided biometric sample was matched by a biometric unit associated with a biometric sensor that obtained the biometric sample.

15. The method of claim 11, wherein the first factor-specific service performs steps comprising: receiving a template to which a provided biometric sample was matched by a biometric unit associated with a biometric sensor that obtained the biometric sample, the template being associated with multiple identities; selecting an identity, from among the multiple identities, based on the biometric sensor that obtained the biometric sample; and providing the selected identity to a client, from among the one or more clients.

16. A computing device comprising:
a first biometric sensor;
a second biometric sensor that is independent of the first biometric sensor;
one or more processing units; and
one or more computer-readable media comprising computer-executable instructions that,
when executed by the one or more processing units, perform steps comprising: receiving information regarding the first biometric sensor; obtaining exclusive control over the first biometric sensor; instantiating a first factor-specific service provider based on a biometric sensor
type of the first biometric sensor, wherein all biometric sensors of a same biometric sensor type as the first biometric sensor will interface exclusively with the first factor-specific service provider;
creating a first biometric unit, exclusively controlled by the first factor-specific service provider, the first biometric unit comprising computer-executable instructions for: receiving biometric samples from the first biometric sensor, providing the received biometric samples to computer-executable instructions directed to processing received biometric samples, providing, from a template database, biometric templates to the computer-executable instructions directed to processing received biometric samples, and storing, in the template database, biometric templates generated by the computer-executable instructions directed to processing received biometric samples;
receiving information regarding the second biometric sensor;
instantiating a second factor-specific service provider, different than the first factor-specific service provider, only if the second biometric sensor is of a different biometric sensor type than the first biometric sensor;
creating a second biometric unit, exclusively controlled by the second factor-specific service provider, for receiving biometric samples from the second biometric sensor, only if the second biometric sensor is of a different biometric sensor type than the first biometric sensor; and creating a second biometric unit, exclusively controlled by the first factor-specific service provider, for receiving the biometric samples from the second biometric sensor, only if the second biometric sensor is of the same biometric sensor type as the first biometric sensor.

17. The computing device of claim 16, wherein the first biometric unit comprises: a sensor plug-in comprising computer-executable instructions for communicating with the first biometric sensor, a processing plug-in comprising the computer-executable instructions of the first biometric unit that are directed to processing received biometric samples, and a storage plug-in comprising computer-executable instructions for interfacing with the template database.

18. The computing device of claim 16, wherein the one or more computer-readable media comprising further computer-executable instructions that, when executed by the one or more processing units, perform steps comprising: receiving, from a requesting client of the one or more clients, a request to collect a biometric sample and determine an identity associated with it; receiving, from a biometric unit associated with a biometric sensor that received the biometric sample, an identity associated with a template to which the biometric sample was matched by the biometric unit; and providing the identity to the requesting client.

19. The computing device of claim 16, wherein the first factor-specific service provider comprises computer-executable instructions for selecting a client, from among two or more clients simultaneously awaiting identities based on biometric samples, to receive an identity associated with a template to which a provided biometric sample was matched by a biometric unit associated with a biometric sensor that obtained the biometric sample.

20. The computing device of claim 16, wherein the first factor-specific service provider comprises computer-executable instructions for:

receiving a template to which a provided biometric sample was matched by a biometric unit associated with a biometric sensor that obtained the biometric sample, the template being associated with multiple identities;

selecting an identity, from among the multiple identities, based on the biometric sensor that obtained the biometric sample; and providing the selected identity to a client, from among the one or more clients.

* * * * *